Figure 1:
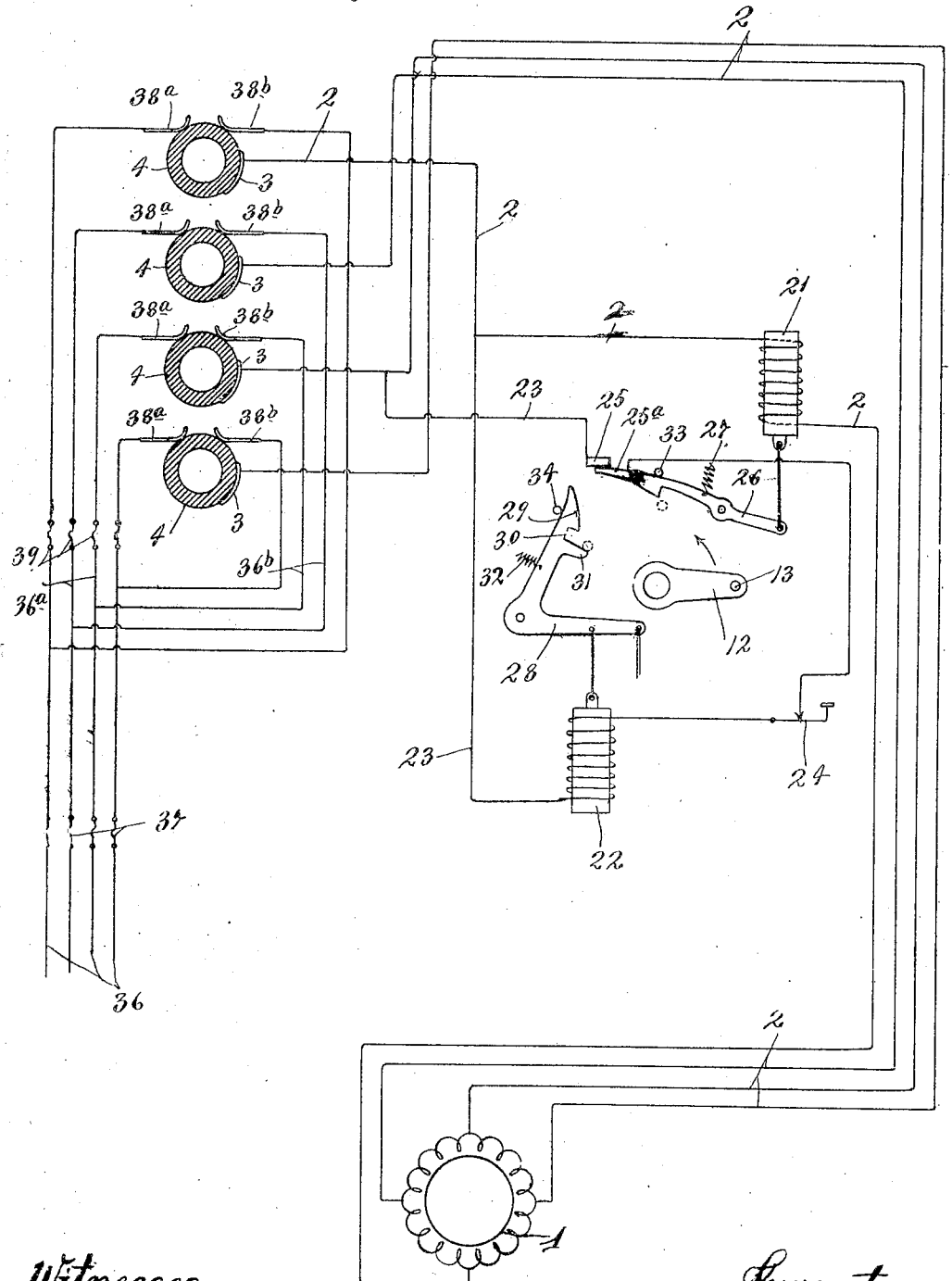

F. G. DUSTIN.
MOTOR STARTING SWITCH.
APPLICATION FILED FEB. 6, 1911.

1,000,384.

Patented Aug. 15, 1911.
2 SHEETS—SHEET 2.

Witnesses.
A. H. Opsahl.
Harry Opsahl.

Inventor
Fred G. Dustin
By his Attorneys
Williamson Merchant

UNITED STATES PATENT OFFICE.

FRED G. DUSTIN, OF MINNEAPOLIS, MINNESOTA.

MOTOR-STARTING SWITCH.

1,000,384.

Specification of Letters Patent. Patented Aug. 15, 1911.

Application filed February 6, 1911. Serial No. 606,793.

*To all whom it may concern:*

Be it known that I, FRED G. DUSTIN, a citizen of the United States, residing at Minneapolis, in the county of Hennepin and State of Minnesota, have invented certain new and useful Improvements in Motor-Starting Switches; and I do hereby declare the following to be a full, clear, and exact description of the invention, such as will enable others skilled in the art to which it appertains to make and use the same.

My invention has for its object to provide an improved motor starting switch especially designed for starting alternating current motors whether of the single phase or of the polyphase types.

To this end, the invention consists of the novel devices and combinations of devices hereinafter described and defined in the claims.

It is a well known fact that most types of alternating current motors require to start them, an abnormally large current in comparison to that required to operate such motors with their normal load and at normal speed. This makes it necessary to use large fuses for starting duty which are, however, much too large to give the proper protection to the motors after they have been started and are in normal running condition. For this reason, while it is necessary to use large fuses for starting such motors, it is very desirable to arrange the motor current to be switched over on the small fuses after the motor has reached its normal speed and current consumption. In starting such motors and in making the change of connections above indicated, it is undesirable to open the motor circuit, even for an instant, since the motor may lose sufficient speed during such brief interval of inoperation in the current supply, that an excessive current will flow through the motor circuit when the running fuses are connected in circuit, and thus cause the smaller running fuses to melt or fuse and thereby open the motor circuit and stop the motor. With present methods of starting such motors, the connections are very often improperly made so that the motor is either started through the running fuses, or left on the large fuse after it is started; in the first instance, blowing the fuse and stopping the motor and in the second instance, leaving the motor on fuses much too large for their proper protection. Moreover, if the power fails on the line for a brief period the motors will slow down or stop, which condition may endanger the motor upon the restoring of the current to the line, if the motor switch has not in the meantime been opened. Furthermore, the present methods of starting the motors requires apparatus which is cumbersome and troublesome to install, and which on account of the many exposed live parts, endanger persons from contact with the same, as well as increasing the fire hazard in the presence of metallic flyings, dust, and inflammable gases or fumes.

In the use of my improved switch, all of the advantages above noted are obtained and all of the undesirable features noted are eliminated; and this is accomplished by an extremely simple and highly efficient mechanism.

The improved switch may take a great many different forms so far as the broad idea of my invention is concerned, but in the drawings I have illustrated but one form thereof, which form, from my experience at the present time, I believe to be the best form for ordinary applications.

In the drawings which illustrate the invention, like characters indicate like parts throughout the several views.

Figure 2:
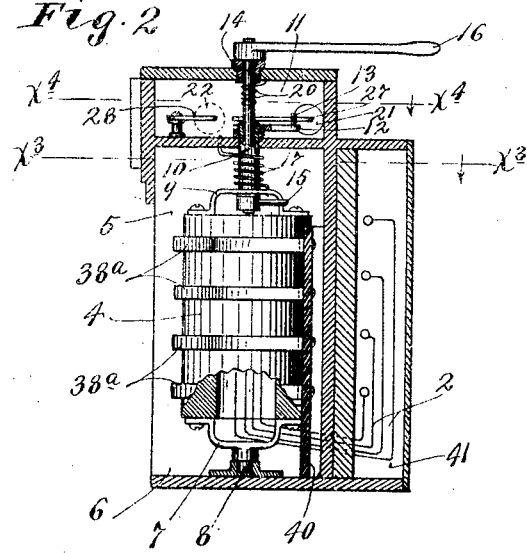
Figure 3:
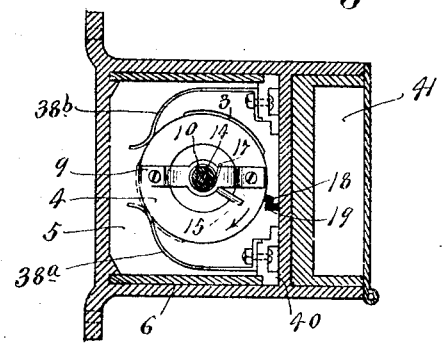
Figure 4:
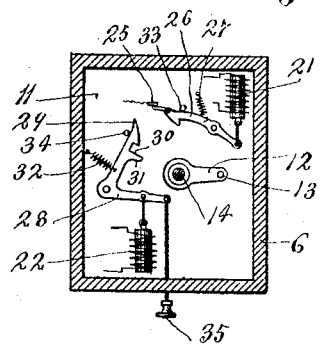

Referring to the drawings, Figure 1 is a diagrammatic view illustrating the operation of the elements of my improved switch in connection with a two-phase alternating motor; Fig. 2 is a vertical section showing the assembled parts of the switch and an oil box for containing the same; Fig. 3 is a horizontal section taken on the line $x^3$ $x^3$ of Fig. 2; and Fig. 4 is a horizontal section taken on the line $x^4$ $x^4$ of Fig. 2.

The motor to be started by the switch is indicated by the numeral 1, and the motor leads, of which, as shown, there are four, are indicated by the numeral 2. The motor leads 2 are connected to movable contacts 3 shown as applied to a rotary or oscillatory drum of insulating material, the said contacts 3 being preferably arranged vertically, one over the other, and on the periphery of the said drum. This drum is herein broadly designated as a contact carrier or controller and is not limited to any particular form or arrangement, but, on the contrary, it is treated broadly as an element or device by the movement or manipulation of which the so-called motor lead contacts may be successively engaged with the so-called starting and running contacts. In Fig. 1, the drum 4 is shown as cut into four sections separated, but in Fig. 2, the drum is shown as an integral or single member rotatively mounted in an oil containing compartment 5 of a box or casing 6. The said drum may be thus mounted for oscillatory movements in different ways, but, as shown, it is provided at its lower end with a yoke 7 having a trunnion seated in a bearing 8 on the bottom of the box 6. At its upper end, the drum 4 is also preferably provided with a similar yoke 9 that is secured on the lower end of a sleeve 10, the upper end of which is journaled in the top plate of the compartment 5 and projects into an upper compartment 11 of the box 6. Within the upper compartment 11, the sleeve 10 is provided with a rigidly secured arm 12 having a pin or lug 13 at its free end.

A short vertical shaft 14 extends through the sleeve 10 and through the top plate of the compartment 11 and is journaled therein. At its extreme lower end, the shaft 14 is provided with a laterally projecting arm 15 that is adapted to engage the upper yoke 9 of the drum 4. At its upper end, the said shaft 14 is provided with an operating lever or arm 16. A coiled torsion spring 17 which, as shown, surrounds the sleeve 10, is attached at one end to the top plate of the compartment 5 and at its lower end to the upper drum yoke 9. This spring 17 exerts a force which tends to rotate the drum 4 in the direction of the arrow marked thereon in Fig. 3, and the movement of the said drum in this direction is limited by the engagement of a stop pin 18 on said drum with a stop pin 19 on one vertical wall of the box 6 (see Fig. 3). A coiled torsion spring 20 attached to the shaft 14 and to the top plate of the box compartment 11, tends to throw the operating lever 16 back to its normal position or in the direction of said arrow, noted, in respect to Fig. 3.

The numeral 21 indicates a solenoid or electro-magnet which is connected in series with one of the motor leads 2, and the numeral 22 indicates another solenoid or electro-magnet or potential coil that is connected across two of the said motor leads 2 by a shunt 23. In the shunt connection 23, is a normally closed hand-operated switch 24 and an automatically actuated switch having normally engaged contacts 25 and 25ª. In the preferred arrangement, the movable contact 25ª is carried by, but insulated from an intermediately pivoted so-called intercepting lever 26. The lever 26 is normally held in position shown in Figs. 1 and 4, by a coiled spring 27 that is preferably made adjustable, and the said lever 26 is connected to the movable member of the solenoid or electro-magnet 21. A core, or movable member of the potential coil 22 operates the so-called running current lock in the form of a pivoted lever 28 provided with a beveled nose 29 with a lock notch 30 and with a stop lug 31. A coiled spring 32 that is preferably adjustable, normally holds the lock lever 28 in the position shown in Figs. 1 and 4. The levers 26 and 28 are, in the construction illustrated, pivoted to the top plate of the box compartment 5, and the said levers, by their respective springs, are normally held against stops 33 and 34 on the said top plate. The numeral 35 indicates a finger actuated stem attached to one arm of the lever 28 and extended to the exterior of the box 6 for the purpose which will hereinafter appear.

The line wires, of which as shown, there are four, are indicated by the numeral 36 and they are provided with the usual main fuses 37. The said line wires are divided into branches 36ª and 36ᵇ that are connected, respectively, to relatively fixed contacts 38ª and 38ᵇ. Running fuses 39 are interposed in the line branches 36ª. The contacts 38ª and 38ᵇ are arranged in pairs for coöperation with the movable contacts 3 of the switch drum 4, and, as shown, the said contacts 38ª and 38ᵇ are attached to an upright plate 40 of insulating material rigidly secured within the compartment 5 of the case 6.

Operation: The operation of the improved switch is substantially as follows: To start the motor, the lever 16 is moved in a direction reversed from that indicated by the arrow marked on Fig. 3, or, in other words, in the direction of the arrow marked on Fig. 1, and the lever will move with it, the drum 4, thereby carrying the motor lead contacts 3 simultaneously into engagement with the several coöperating contacts 38ᵇ. This will close the motor circuit from the line through the magnet 21, and this magnet being energized by the abnormally high current then delivered to the motor leads, will move the lever 26, against the tension of its spring 27, into a position in which its hooked end will engage the pin 13 of the arm 12 and thereby intercept, or arrest, further movement of the drum 4 and its contacts 3, in a position in which the said contacts 3 have not yet been moved into engagement with the contacts 38ª. The above noted movement of the intercepting lever 26 also serves to separate the contacts 25 and 25ª and thus break the circuit through the shunt 23 and potential magnet 22.

By the above noted initial or primary movement of the contacts 3, the circuit for starting the motor under abnormally high current is established, through the line fuses 37 but not the running fuses 39, and the drum 4 and lever 16 of the starting switch are temporarily locked against further movement in the direction stated. The tension of the spring 27 is, however, so adjusted that the magnet 21 can hold the intercepting lever 26 in its operative position, only as long as the current in the motor leads is abnormal or above that required for maintaining the motor at normal speed under normal load. As soon as normal conditions are established in the motor leads, the spring 27 will overcome the force of the magnet 21 and restore the lever 26 to its normal position shown in Figs. 1 and 4, thereby closing the circuit through the potential coil or magnet 22 and releasing the drum and lever of the starting switch so they may be given further rotation in the direction of the arrow marked on Fig. 1 This further movement of the said drum and lever in the direction indicated, moves the motor lead contacts 3 into engagement with the coöperating contacts 38ᵃ before they have left contact with the coöperating contact 38ᵇ, thus preventing even temporary breaking of the motor circuit. After the contacts 3 have been engaged with the contact 38ᵃ, they may, by further movement of the lever 16, and drum 4, be moved out of engagement with the said contact 38ᵇ. The movement of the drum 4 and lever 16 in the direction stated, to-wit, in the direction of the arrow in Fig. 1, is limited by the engagement of the pin 13 of the arm 12 with the stop lug 31 of the running circuit lock 28. At this time, the magnet 22, being energized, as already stated, holds the lock 28 in position in which its notch 30 will engage the pin 13 of the arm 12 and thereby lock the drum 4 with its contacts 3 engaged with the contacts 38ᵃ, but disengaged from the contacts 38ᵇ, so that the motor circuit will then be closed through the line branch wires 36ᵃ and running fuses 39. When the lever 16 is released, its spring 20 will throw the same back to its normal position, but the drum 4 and its contacts 3 will be held, as just stated, as long as the normal current is maintained in the motor circuit. If, however, an abnormally high current should be produced in the motor circuit, the energy of the magnet 21 will be increased and caused to move the lever 26 into a position to separate the contacts 25 and 25ᵃ. This separation of the said contacts 25 and 25ᵃ opens the circuit of the magnet 22, thereby causing the latter to be deënergized, which permits the spring 32 to throw the running current lock 28 to its normal position shown in the drawings. In this way, the drum 4 is released and its spring 17 then quickly throws the same back into its normal position and opens the motor circuit thereby stopping the motor. This automatic feature of the switch is highly important because it protects the motor from an abnormally high current. The motor may, with the system illustrated, be stopped, also, at will, either by opening the switch 24 or by pressing on the head of the stem 35. The opening of the switch 24 serves to break the shunt 23 thereby deënergizing the magnet 22 and permitting the spring 32 to throw the lock lever 28 into its inoperative position shown in Fig. 1. By pressing on the end of the stem 35, the said lock lever 28 is mechanically forced into its releasing position stated, against the force of the said magnet 22. In either case, when the lock lever 2 is forced into its releasing position stated, the spring 17 becomes active to instantly return the drum 4 and its motor lead contacts 3 back to their normal positions shown in the drawings, and, as before stated, opens the motor circuit and stops the motor. It will thus be seen that the running fuses are protected while the motor is being started and that the said running fuses protect the motor after the motor is started and when it is running under normal conditions. As shown, the switch box 6 is provided at one side with a third compartment 41 which is adapted to contain the running fuses 39 and other motor line connections.

In some types of motors the relative arrangement of the contacts 3, 38ᵃ and 38ᵇ should be such that the said contacts 3 will be moved out of engagement with the contacts 38ᵇ before they are brought into engagement with the contacts 38ᵃ. It will, of course, be understood that the so-called running fuses and starting fuses are, in fact, automatic circuit breakers, and the above expressions are, therefore, used in this broad sense.

What I claim is:—

1. A motor starting switch comprising starting and running contacts, a motor lead contact, a contact carrier for controlling the engagement of said motor lead contact with the said starting and running contacts, a lock for securing said contact carrier with the motor lead contact engaged with said running contact, and an intercepting device operative to interrupt the movement of said contact carrier and hold the same with the motor lead contact temporarily engaged with said starting contact, and an operating handle for said contact carrier movable to set the same in an operative position but returnable independently thereof.

2. A motor starting switch comprising starting and running contacts, a contact carrier provided with motor lead contacts movable thereby first into engagement with said starting contacts and then into engagement with said running contacts, a running circuit lock operative to hold said contact carrier with said motor lead contacts engaged with said running contacts, and an intercepting device operative to temporarily interrupt the movement of said contact carrier while said motor lead contacts are engaged with said starting contacts, an operating handle for said contact carrier movable to set the same in an operative position but returnable independently thereof, and means for automatically returning said handle to normal position when released.

3. In a motor starting switch, the combination with starting contacts and running contacts, running fuses connected to said running contacts, of a contact carrier provided with motor lead contacts movable thereby first into engagement with said starting contacts and then into engagement with said running contacts, a running circuit lock operative to hold said contact carrier with the motor lead contacts engaged with said running contacts, a magnetic controller for said lock, an intercepting device operative to interrupt the movement of said contact carrier in a position in which the said motor lead contacts are engaged with said starting contacts, and a magnetic controller for said intercepting device.

4. In a motor starting switch, the combination with starting contacts and running contacts, running fuses connected to said running contacts, of a contact carrier provided with motor lead contacts movable thereby first into engagement with said starting contacts and then into engagement with said running contacts, a running circuit lock operative to hold said contact carrier with the motor lead contacts engaged with said running contacts, a magnetic controller for said lock, an intercepting device operative to interrupt the movement of said contact carrier in a position in which the said motor lead contacts are engaged with said starting contacts, a magnetic controller for said intercepting device, and contacts in the circuit connection to the magnetic controller of said running circuit lock normally engaged but adapted to be separated by the action of the magnetic controller of said intercepting device.

5. A line circuit having starting and running branches, a running fuse in said running branches, and a motor having leads, in combination with a motor starting switch comprising starting and running contacts connected respectively to said starting and running line branches, motor lead contacts connected to the motor leads, a contact carrier for engaging said motor lead contacts first with said starting contacts and then with said running contacts, a running circuit lock for holding said contact carrier with said motor lead contacts engaged with said running contacts, an intercepting device for interrupting the movement of said contact carrier with said motor lead contacts engaged with said starting contacts, a magnetic controller for said running circuit lock connected in a shunt across the motor leads, and a magnetic controller for said interrupting device connected in series with one or more of the motor leads.

6. A line circuit having starting and running branches, running fuses in said running branches, and a motor having leads, in combination with a motor starting switch comprising starting and running contacts connected respectively to said starting and running line branches, motor lead contacts connected to the motor leads, a contact carrier for engaging said motor lead contacts first with said starting contacts and then with said running contacts, a running circuit lock for holding said contact carrier with said motor lead contacts engaged with said running contacts, an intercepting device for interrupting the movement of said contact carrier with said motor lead contacts engaged with said starting contacts, a magnetic controller for said running circuit lock connected in a shunt across the motor leads, a magnetic controller for said interrupting device connected in series with one or more of the motor leads, and a switch normally closing the said shunt but arranged to be opened by the action of the magnetic controller of said interrupting device.

7. A motor starting switch comprising starting and running contacts, a contact carrier provided with motor lead contacts movable thereby first into engagement with said starting contacts and then into engagement with said running contacts, a running circuit lock operative to hold said contact carrier with said motor lead contacts engaged with said running contacts, an intercepting device operative to temporarily interrupt the movement of said contact carrier while said motor lead contacts are engaged with said starting contacts, a magnetic circuit actuated controller for said intercepting device, and a device operative at will for moving said running circuit lock into an inoperative or releasing position.

8. In a motor starting switch, the combination with starting contacts and running contacts, running fuses connected to said running contacts, of a contact carrier provided with motor lead contacts movable thereby first into engagement with said starting contacts and then into engagement with said running contacts, a running circuit lock operative to hold said contact carrier with the motor lead contacts engaged with said running contacts, a magnetic controller for said lock, an intercepting device operative to interrupt the movement of said contact carrier in a position in which the said motor lead contacts are engaged with said starting contacts, a magnetic controller for said intercepting device, contacts in the circuit connection to the magnetic controller of said running circuit lock normally engaged but adapted to be separated by the action of the magnetic controller of said intercepting device, and means operative at will and independently of said magnetic controllers, for moving said running circuit lock into an inoperative or releasing position.

9. In a motor starting switch, the combination with starting contacts and running contacts, running fuses connected to said running contacts, of a contact carrier provided with motor lead contacts movable thereby first into engagement with said starting contacts and then into engagement with said running contacts, a running circuit lock operative to hold said contact carrier with the motor lead contacts engaged with said running contacts, a magnetic controller for said lock, an intercepting device operative to interrupt the movement of said contact carrier in a position in which the said motor lead contacts are engaged with said starting contacts, a magnetic controller for said intercepting device, and contacts in the circuit connection to the magnetic controller of said running circuit lock normally engaged but adapted to be separated by the action of the magnetic controller of said intercepting device, and a switch operative at will to break the circuit through the magnetic controller of said running circuit lock.

10. A line circuit having starting and running branches, and a motor having leads, in combination with a motor starting switch comprising starting and running contacts connected, respectively, to said starting and running line branches, motor lead contacts connected to said motor leads, a contact carrier for engaging said motor lead contacts, first with said starting contacts and then with said running contacts, a running circuit lock for holding said contact carrier with said motor lead contacts engaged with the said running contacts, a shunt connected across said motor leads and including a switch and a magnetic controller for said running circuit lock, and a magnetic controller for said switch connected in series with one of said motor leads, and operative, under overload, to open said shunt circuit, and release said running circuit lock.

11. A motor starting switch comprising starting and running contacts, a motor lead contact, a contact carrier for controlling the engagement of said motor lead contact with the said starting and running contacts, a lock for securing said contact carrier with said motor lead contact engaged with said running contacts, an intercepting device operative to intercept the movement of said contact carrier and hold the same with said motor lead contact temporarily engaged with said starting contact, and an automatic current actuated controller for said intercepting device.

In testimony whereof I affix my signature in presence of two witnesses.

FRED G. DUSTIN.

Witnesses:
HARRY D. KILGORE,
F. D. MERCHANT.

---

Copies of this patent may be obtained for five cents each, by addressing the "Commissioner of Patents, Washington, D. C."